United States Patent
Lederman et al.

(10) Patent No.: US 11,010,774 B2
(45) Date of Patent: May 18, 2021

(54) CUSTOMER SEGMENTATION BASED ON LATENT RESPONSE TO MARKET EVENTS

(71) Applicant: International Business Machines Corporation, Armonk, NY (US)

(72) Inventors: Roger Douglas Lederman, Briarcliff Manor, NY (US); Herbert Scott McFaddin, Yorktown Heights, NY (US); Chandrasekhar Narayanaswami, Wilton, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 223 days.

(21) Appl. No.: 15/282,703

(22) Filed: Sep. 30, 2016

(65) Prior Publication Data

US 2018/0096371 A1    Apr. 5, 2018

(51) Int. Cl.
    *G06Q 30/02*      (2012.01)
    *H04L 29/08*      (2006.01)

(52) U.S. Cl.
    CPC ......... *G06Q 30/0204* (2013.01); *H04L 67/10* (2013.01)

(58) Field of Classification Search
CPC .... G06Q 10/00; G06Q 40/00; G06Q 30/0204; H04L 67/10
USPC .............................................. 705/7.29–7.33
See application file for complete search history.

(56) References Cited

U.S. PATENT DOCUMENTS

| | | | |
|---|---|---|---|
| 2007/0203773 A1 | 8/2007 | Milne | |
| 2008/0120129 A1* | 5/2008 | Seubert | G06Q 10/10 705/35 |
| 2010/0153211 A1* | 6/2010 | Ramer | G06Q 10/10 705/14.52 |
| 2011/0191141 A1* | 8/2011 | Thompson | G06Q 30/02 705/7.32 |
| 2012/0041819 A1* | 2/2012 | Ramer | G06Q 30/0247 705/14.46 |
| 2012/0116840 A1 | 5/2012 | Omer | |
| 2012/0290357 A1* | 11/2012 | Hamlisch | G06Q 30/0204 705/7.31 |
| 2012/0290361 A1 | 11/2012 | Hills et al. | |
| 2013/0191195 A1 | 7/2013 | Carlson et al. | |
| 2013/0297543 A1* | 11/2013 | Treiser | G06Q 30/02 706/45 |
| 2013/0342538 A1* | 12/2013 | Kozine | H04L 43/04 345/440 |
| 2014/0012628 A1* | 1/2014 | Hsieh | G06Q 30/0202 705/7.31 |

(Continued)

OTHER PUBLICATIONS

Mel, et al. "The NIST Definition of Cloud Computing". Recommendations of the National Institute of Standards and Technology. Nov. 16, 2015.

(Continued)

*Primary Examiner* — Romain Jeanty
(74) *Attorney, Agent, or Firm* — Joseph Petrokaitis, Esq.; McGinn IP Law Group, PLLC (57) ABSTRACT

A customer segmentation method, system, and computer program product, include inputting a set of characteristic features for each of a plurality of customers, defining a customer-event map that maps the characteristic features of each of the customers to a plurality of event categories, and estimating a likelihood of an event driven purchase for each product type and an event category combination.

16 Claims, 6 Drawing Sheets

(56) References Cited

U.S. PATENT DOCUMENTS

| | | | |
|---|---|---|---|
| 2014/0040023 A1 | 2/2014 | Mohan | |
| 2014/0067472 A1* | 3/2014 | Mayes | G06Q 30/0203 705/7.32 |
| 2014/0100918 A1 | 4/2014 | Rosenberger et al. | |
| 2014/0164171 A1* | 6/2014 | Lu | G06Q 30/0207 705/26.7 |
| 2014/0222506 A1* | 8/2014 | Frazer | G06Q 30/02 705/7.29 |
| 2014/0278990 A1* | 9/2014 | Swanson | G06Q 30/0257 705/14.55 |
| 2014/0279868 A1* | 9/2014 | Astorg | G06F 16/22 707/609 |
| 2015/0032502 A1 | 1/2015 | Green et al. | |
| 2015/0046223 A1 | 2/2015 | Sewak | |
| 2015/0106867 A1 | 4/2015 | Liang | |
| 2015/0317589 A1 | 11/2015 | Anderson et al. | |
| 2015/0348057 A1* | 12/2015 | Parpia | G06Q 30/0201 705/7.29 |
| 2016/0063419 A1 | 3/2016 | Martinez et al. | |
| 2016/0171540 A1 | 6/2016 | Mangipudi et al. | |
| 2016/0275413 A1 | 9/2016 | Shi et al. | |
| 2017/0235848 A1 | 8/2017 | Van Dusen et al. | |
| 2017/0278053 A1 | 9/2017 | High et al. | |
| 2017/0316438 A1 | 11/2017 | Konig et al. | |
| 2018/0053199 A1 | 2/2018 | Mathis et al. | |
| 2018/0285682 A1 | 10/2018 | Najibi et al. | |

OTHER PUBLICATIONS

"System and Method of Dynamic Customer Segmentation for Utility Customers". An IP.com Prior Art Database Technical Disclosure. Oct. 14, 2011.

"Brand Penetration and Lifestyle Analysis of Customer Base From Machine Generated non-promotional SMS CDRs". An IP.com Prior Art Database Technical Disclosure. Feb. 26, 2014.

"Cognitive method for predicting emerging application requirement". An IP.com Prior Art Database Technical Disclosure. Mar. 1, 2016.

United States Office Action dated Jun. 12, 2019, in co-pending U.S. Appl. No. 15/282,629.

United States Office Action dated Feb. 6, 2019, in co-pending U.S. Appl. No. 15/282,629.

United States Office Action dated Feb. 19, 2019, in co-pending U.S. Appl. No. 15/282,637.

United States Office Action dated Dec. 31, 2019, in co-pending U.S. Appl. No. 15/282,637.

United States Office Action dated Jan. 23, 2020, in co-pending U.S. Appl. No. 15/282,629.

United States Office Action dated Oct. 15, 2019, in co-pending U.S. Appl. No. 15/282,637.

United States Office Action dated Apr. 1, 2020, in co-pending U.S. Appl. No. 15/282,637.

United States Office Action dated May 6, 2020, in co-pending U.S. Appl. No. 15/282,629.

United States Office Action dated Oct. 22, 2020, in co-pending U.S. Appl. No. 15/282,637.

United States Office Action dated Sep. 9, 2020, in co-pending U.S. Appl. No. 15/282,637.

Capistran, Carlos, and Allan Timmermann. "Forecast combination with entry and exit of experts." Journal of Business & Economic Statistics 27.4 (2009): 428-440. (Year: 2009).

Trapero, Juan R., Nikolaos Kourentzes, and Robert Fildes. "On the identification of sales forecasting models in the presence of promotions." Journal of the operational Research Society 66.2 (2015): 299-307. (Year: 2015).

Ali, Ozden Gur, et al. Pooling information across SKUs for demand forecasting with data mining. working paper, 2007. (Year: 2007).

* cited by examiner

CUSTOMER SEGMENTATION BASED ON LATENT RESPONSE TO MARKET EVENTS

CROSS REFERENCE TO RELATED APPLICATIONS

The present application is a related Application of co-pending U.S. patent application Ser. No. 15/282,629, IBM Disclosure No. YOR920161306US1 and U.S. patent application Ser. No. 15/282,637, IBM Disclosure No. YOR920161304US1, each of which was filed on Sep. 30, 2016, the entire contents of which are incorporated herein by reference.

BACKGROUND

The present invention relates generally to a customer segmentation method, and more particularly, but not by way of limitation, to a system, method, and computer program product for grouping retail/grocery customers who exhibit similar patterns of response.

For individual target event promotions, there is a need to characterize customers by their event response. For other decisions, segmentation can be critical in understanding event impacts. For example, without segmentation, a grocer planning a promotion around a holiday may not find evidence of the holiday shopping in historical data due to the holiday's close timing to other events (e.g., local town parade, football game, other holidays, etc.).

Some conventional techniques have considered clustering together similar time series, but these techniques do not address causality and are concerned only with similarity of patterns. Other conventional techniques have considered latent class segmentation that models customer behavior as a function of some heterogeneous underlying latent variables. However, these techniques are static models that do not handle events. Some other conventional techniques have considered hidden Markov models that cover dynamic state transitions by customer, but have not considered the impact of external events on a customer model.

SUMMARY

Thus, the inventors have considered the technical solution to the technical problem in the conventional techniques of solving for causation in customer trends by using transaction data to group retail/grocery customers who exhibit similar patterns of response to market events by deviating from historical patterns. Since events affect different customer sets, a latent response model is used to overcome prevailing challenges in observing responses directly. Thereby, sellers can use customer groupings to help plan promotions, plan inventory, and optimize placement of items or signage within a store.

In an exemplary embodiment, the present invention can provide a computer-implemented customer segmentation method, the method including inputting a set of characteristic features for each of a plurality of customers, defining a customer-event map that maps the characteristic features of each of the customers to a plurality of event categories, and estimating a likelihood of an event driven purchase for each product type and an event category combination.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

The invention will now be described with reference to FIG. 1-7, in which like reference numerals refer to like parts throughout. It is emphasized that, according to common practice, the various features of the drawing are not necessarily to scale. On the contrary, the dimensions of the various features can be arbitrarily expanded or reduced for clarity.

Figure 1:
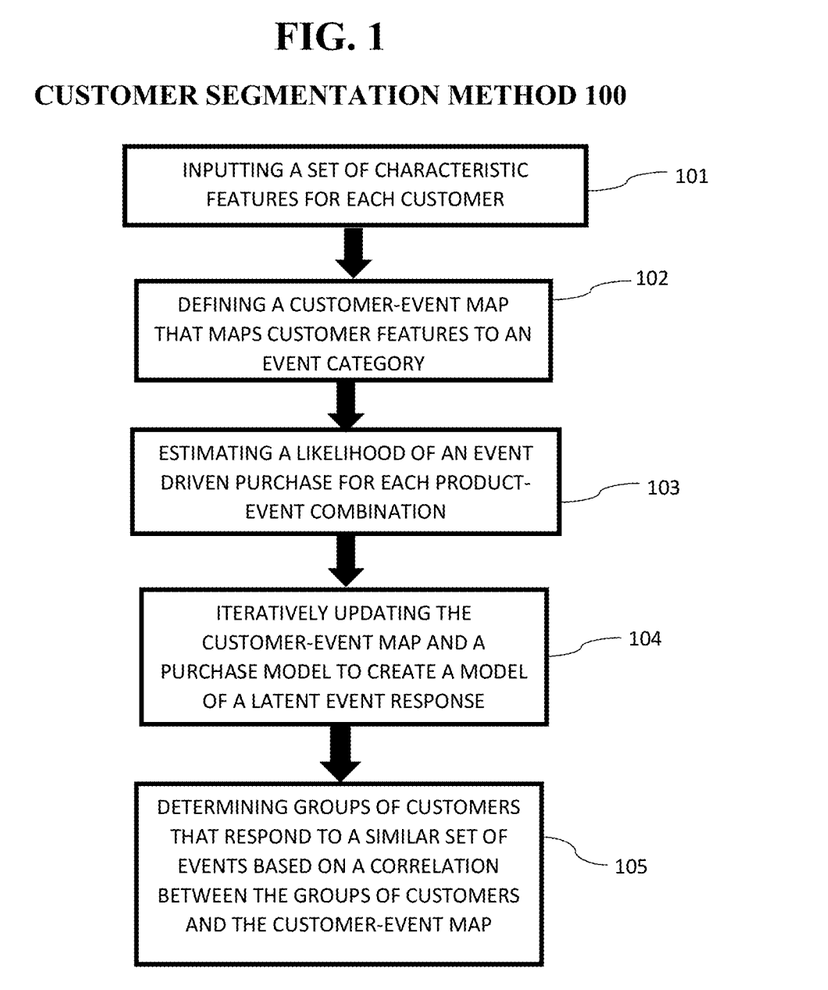
FIG. 1 exemplarily shows a high-level flow chart for a customer segmentation method 100.

With reference now to the example depicted in FIG. 1, the customer segmentation method 100 includes various steps to group customers who exhibit similar responses to events by operating in a setting where the product set to target for an event is not known a priori, and the customers purchase motive (whether or not the purchase is event-driven) cannot be observed directly in order to model the likelihood that a specific type of event influences a customer as a latent variable. As shown in at least FIG. 5, one or more computers of a computer system 12 according to an embodiment of the present invention can include a memory 28 having instructions stored in a storage system to perform the steps of FIG. 1.

Thus, the customer segmentation method 100 according to an embodiment of the present invention may act in a more sophisticated, useful and cognitive manner, giving the impression of cognitive mental abilities and processes related to knowledge, attention, memory, judgment and evaluation, reasoning, and advanced computation. A system can be said to be "cognitive" if it possesses macro-scale properties—perception, goal-oriented behavior, learning/ memory and action—that characterize systems (i.e., humans) generally recognized as cognitive.

Although one or more embodiments (see e.g., FIGS. 5-7) may be implemented in a cloud environment 50 (see e.g., FIG. 6), it is nonetheless understood that the present invention can be implemented outside of the cloud environment.

In step 101, a set of characteristic features for each customer are input. Characteristic features of the customers can include, for example, age, location, religion, social media interests, etc. Further, characteristic features can include demographic information as well as features constructed from purchasing history. Examples of demographic information are age, gender, income, education level, household size, etc. If not obtained for individuals, address can be used to map to a census block. These and other census statistics are available at that level. Examples of constructed features include share of historical purchases by product category, share of historical purchases by day of week and time of day, historical shopping frequency, historical basket size, and price preference.

In step 102, a customer-event map is defined that maps customer features to a type of event category. The type of event categories include, for example, public holidays, religious holidays, town events such as local parades, a football game, a tail-gate, a university move-in date, etc. That is, the characteristic features of the customers are used to map the customers to a type of event category. The type of event categories requires pre-processing to categorize the events. That is, events are grouped into categories. For example, for a category c, M_{ic} is computed as the likelihood of a customer i responding to an event of type c. With this, a minimum value m_c of M_{ic} for each event c is chosen, and can be used to create a mapping that associates all customers with M_{ic}>m_c to events of type c. This mapping gives a possible customer segmentation to output, although segments are overlapping. If disjoint segments are required we can cluster the customer i by their vector of values of M_{ic}.

In step 103, a likelihood of an event driven purchase for each product-event combination is estimated. A product-event combination is a product that is typically associated as purchased with an event (e.g., hot dogs for a tail gate, balloons for a birthday party, hams at Easter, Turkey on Thanksgiving, etc.) The likelihood is estimates based on a function factoring the likelihood that a customer type i purchases for category c events. In other words, the likelihood of a purchase of a particular product by a customer during a window of the event can be expressed as a mixture of the mode-based purchase likelihoods for each concurrent event, weighted by the estimated impact. The model is solved over all parameters to find the most likely set of parameters. This can be done using an expectation-maximization algorithm such as Markov Chain Monte Carlo algorithm or other heuristic solution approaches.

Figure 2:
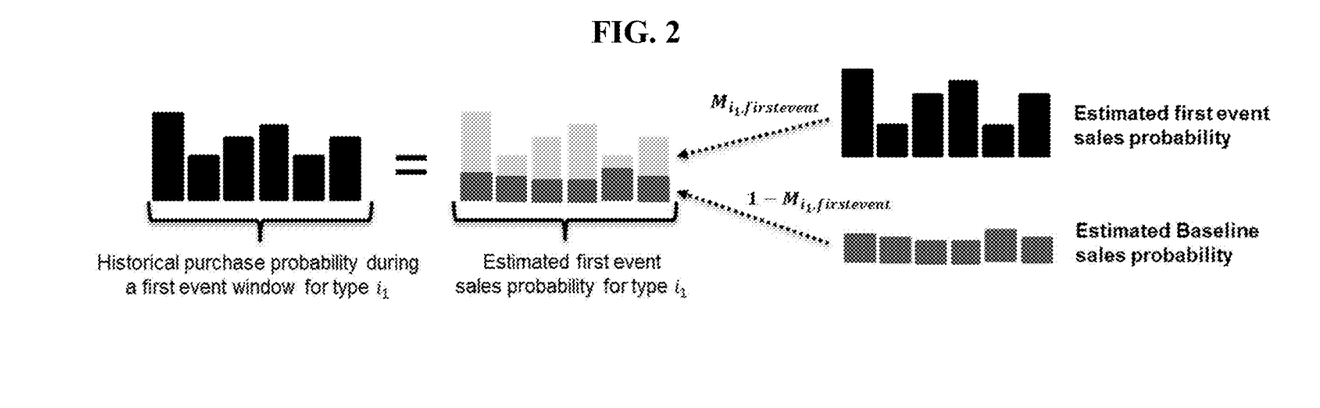
FIG. 2 exemplarily depicts latent event-membership variables of the customer segmentation method 100.

In step 103, a likelihood of the event-driven purchase for each product event combination is estimated by fitting a behavioral model corresponding to each event of interest. Latent variables are used to determine a mixture of event types that best explain each customers temporal purchase patterns. For example, as shown in FIG. 2, the historical purchase probability during a first event window for type $i_1$ is used to subtract the estimated baseline sales probability (e.g., the sales for the product under normal conditions) to determine the estimated first event sales probability (e.g., the likelihood of the event-driven purchase).

Figure 3:
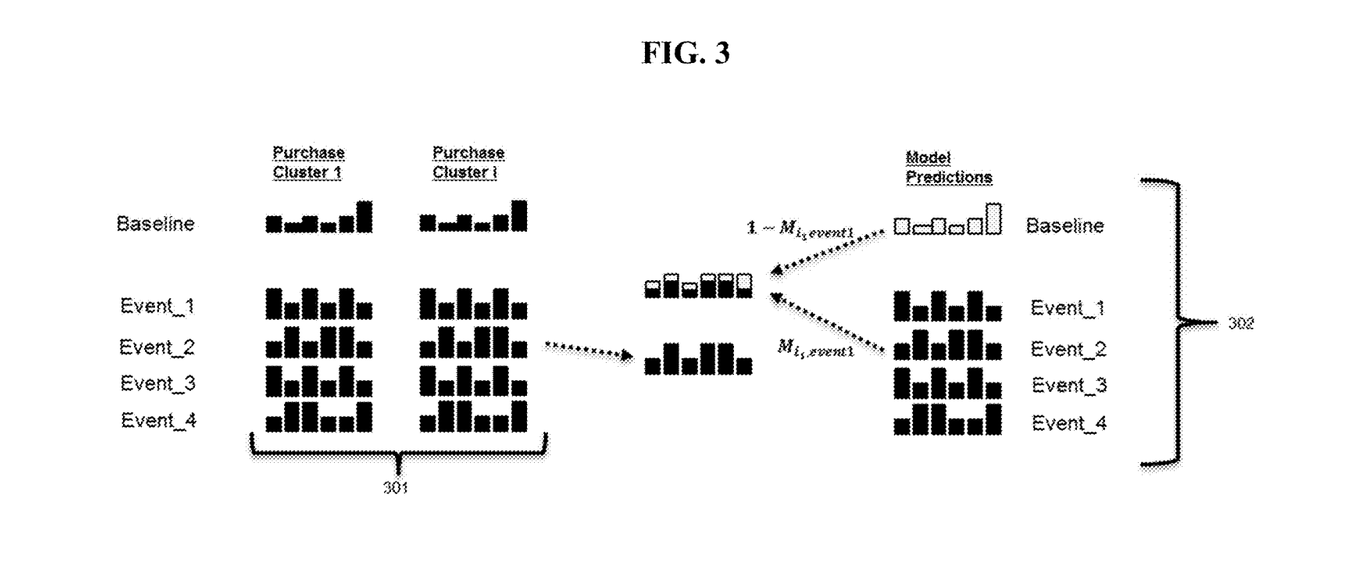
FIG. 3 exemplarily depicts event segments constructed by isolating types that deviate most from a baseline.

In some embodiments, a mixture of event types that best explain each customers temporal purchase patterns are used to solve for the parameters producing a closest match over all event-customer combinations. As shown in FIG. 3, purchase clusters for the historical likelihoods of commodity set during each event in a selected category for Event_1, Event_2, Event_3, and Event_4 are used with event segment purchase probability as predicted by the model predictions for Event_1, Event_2, Event_3, and Event_4. The model predictions for the events give weight to both event segment and baseline probabilities. The weight is estimated as a function of the customer's purchase cluster and demographic (e.g., customer characteristics). The purchase clusters and the model predictions are used to solve for parameters producing a closest match over all event-customer combinations. That is, the customer-event map and the purchase model are iteratively updated to create a model of a latent event response in step 104.

In steps 103 and 104, event segments are defined as latent customer segments that may be recovered during estimation of a mixture model for customer purchasing. Latent event response is captured by the quantity $M_{ikt}(\alpha)$, which models the likelihood that event k causes customer i to purchase in period t. The segmentation methodology relies on an estimation of the parameters $\alpha$ and then constructing a mapping of customers to segments based on $M_{ikt}(\alpha)$. That is, it is assumed that the ability to compute an event-product matrix R, such that $R_{kj}=1$ when product j is purchased for event k and $R_{kj}=0$ otherwise. Then, $\alpha$ is estimated and to maximize the likelihood function (1):

$$L(\alpha) = \prod_i \prod_t \sum_{k \in K_t} M_{ikt}(\alpha) \prod_j [R_{kj}]^{y_{ijt}} [1 - R_{kj}]^{(1-y_{ijt})}. \quad (1)$$

The function Mad can be structured to take into account customer characteristics $w_i$. This may take the form of function (2):

$$M_{ikt}(\alpha) = \frac{e^{(\alpha_{c_k})^T w_i}}{\sum_{l \in K_t} e^{(\alpha_{c_l})^T w_i}}. \quad (2)$$

It is noted that customers $i \in I$, products $j \in J$, and events $k \in K$, event category $c \subseteq K$ (with $c_k$ denoting a (unique) category containing k), time periods $t \in T$ (with $K_t \subseteq K$ denote the set of events occurring during t), a customer characteristic vector $w_i$, and a purchase indicator: $y_{ijt}$.

In step 104, the customer-event map and the purchase model are iteratively updated to create a model of a latent event response by estimating both $M_{ikt}$ and $P_{kj}$ (quantity) simultaneously. In this case, $\alpha$ and $v$ are estimated jointly to maximize the likelihood function:

$$L(\alpha, v) = \prod_i \prod_t \sum_{k \in K_t} M_{ikt}(\alpha) \prod_j [P_{kj}(v)]^{y_{ijt}} [1 - P_{kj}(v)]^{(1-y_{ijt})} \quad (3)$$

The likelihood function (3) is an expectation-maximization approach that alternates between computation of a and v parameters. The expectation step takes v as given, and computes the expectation of $M_{ikt}$, conditional on v and y. The maximization step then takes the latest values of $M_{ikt}$, and solves for v while holding function (3) fixed. Both sub-problems can be solved efficiently, and iteration can be done between them until reaching convergence.

In step 105, groups of customers that respond to a similar set of events are determined based on a correlation between the groups of customers and the customer-event map. That is, the highest value in the likelihood is achieved if the customer-event map is calibrated to group customers who purchase both at the same time points and purchase the same product. Note that customers are allowed to have some baseline purchasing as well (this is a default category of events) so when we say customers purchase at the same time points, this means that their deviations from baseline purchasing are correlated in both time and in product selection.

Figure 4:
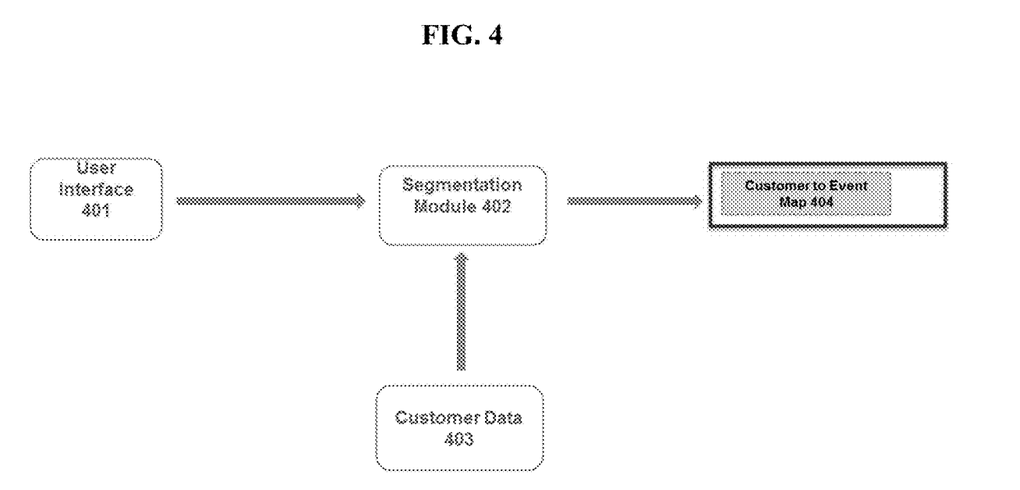
FIG. 4 exemplarily depicts a process flow to a segmentation module 402 which produces a customer to event map 404.

As exemplarily shown in FIG. 4, a user interface 401 can be used to input a calendar of events (e.g., to determine an event category) and the event categorization for each of the events on the calendar into the segmentation module 402. The customer data 403 is retrieved by the segmentation module including the customer characteristic features and the daily customer spend by commodity. The segmentation module estimates the likelihood of the event driven purchase for each product combination and determined groups of customers that respond to similar sets of events based on the correlations between the groups of customers and the customer-event map.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
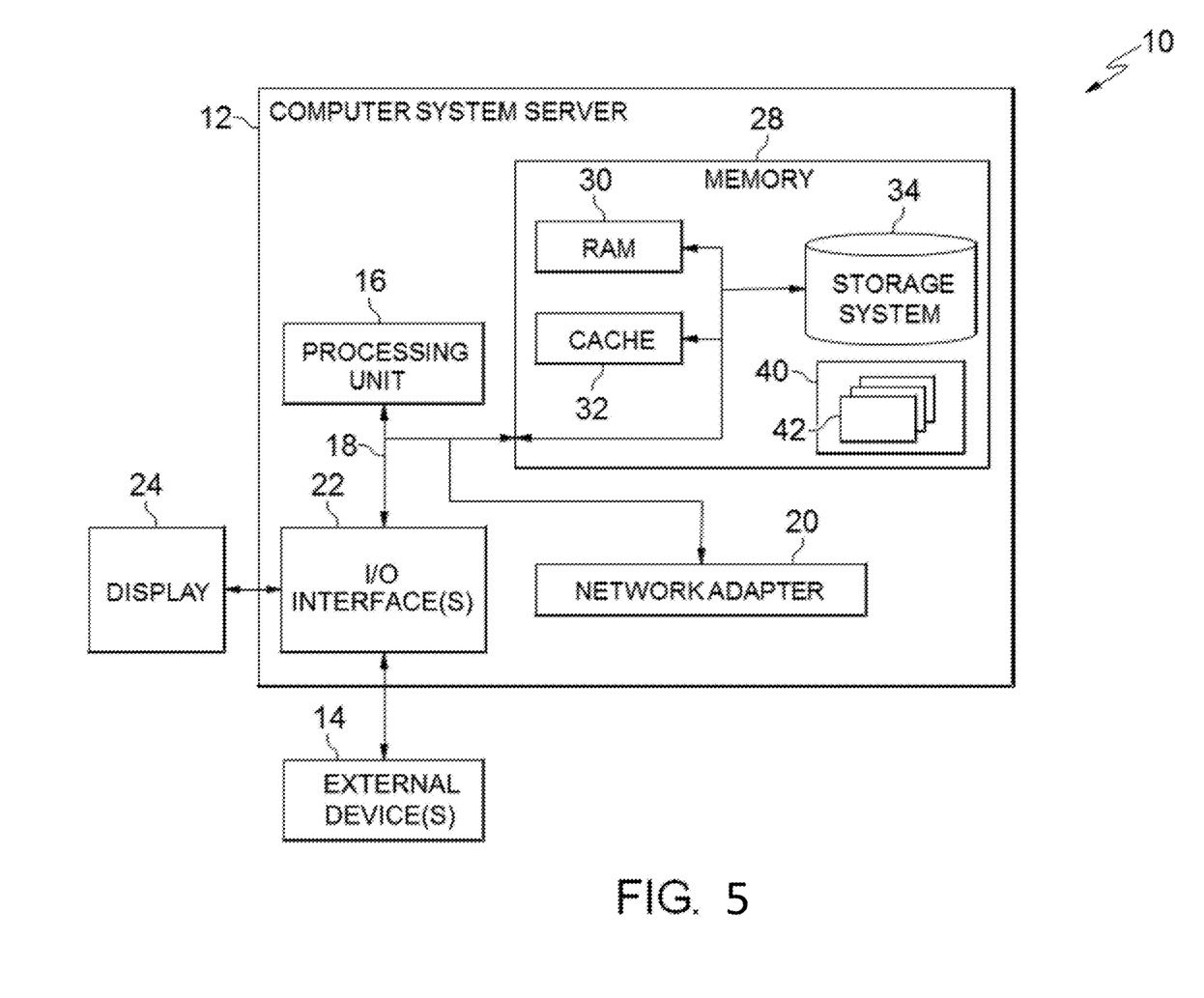
FIG. 5 depicts a cloud computing node 10 according to an embodiment of the present invention.

Referring now to FIG. 5, a schematic of an example of a cloud computing node is shown. Cloud computing node 10 is only one example of a suitable node and is not intended to suggest any limitation as to the scope of use or functionality of embodiments of the invention described herein.

Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 5, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 6:
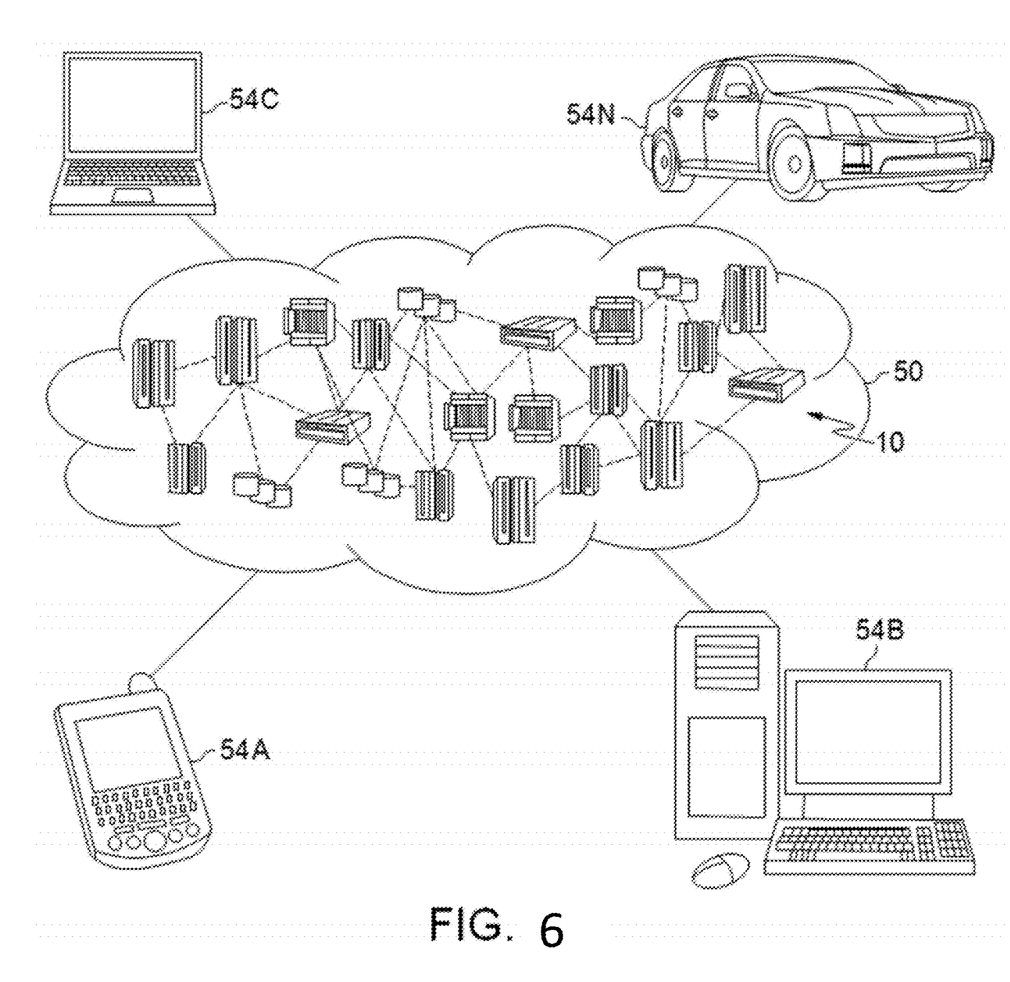
FIG. 6 depicts a cloud computing environment 50 according to an embodiment of the present invention.

Referring now to FIG. 6, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 6 are intended to be illustrative only and that computing nodes 10 and cloud computing environment 50 can communicate with any type of computerized circuit over any type of network and/or network addressable connection (e.g., using a web browser).

Figure 7:
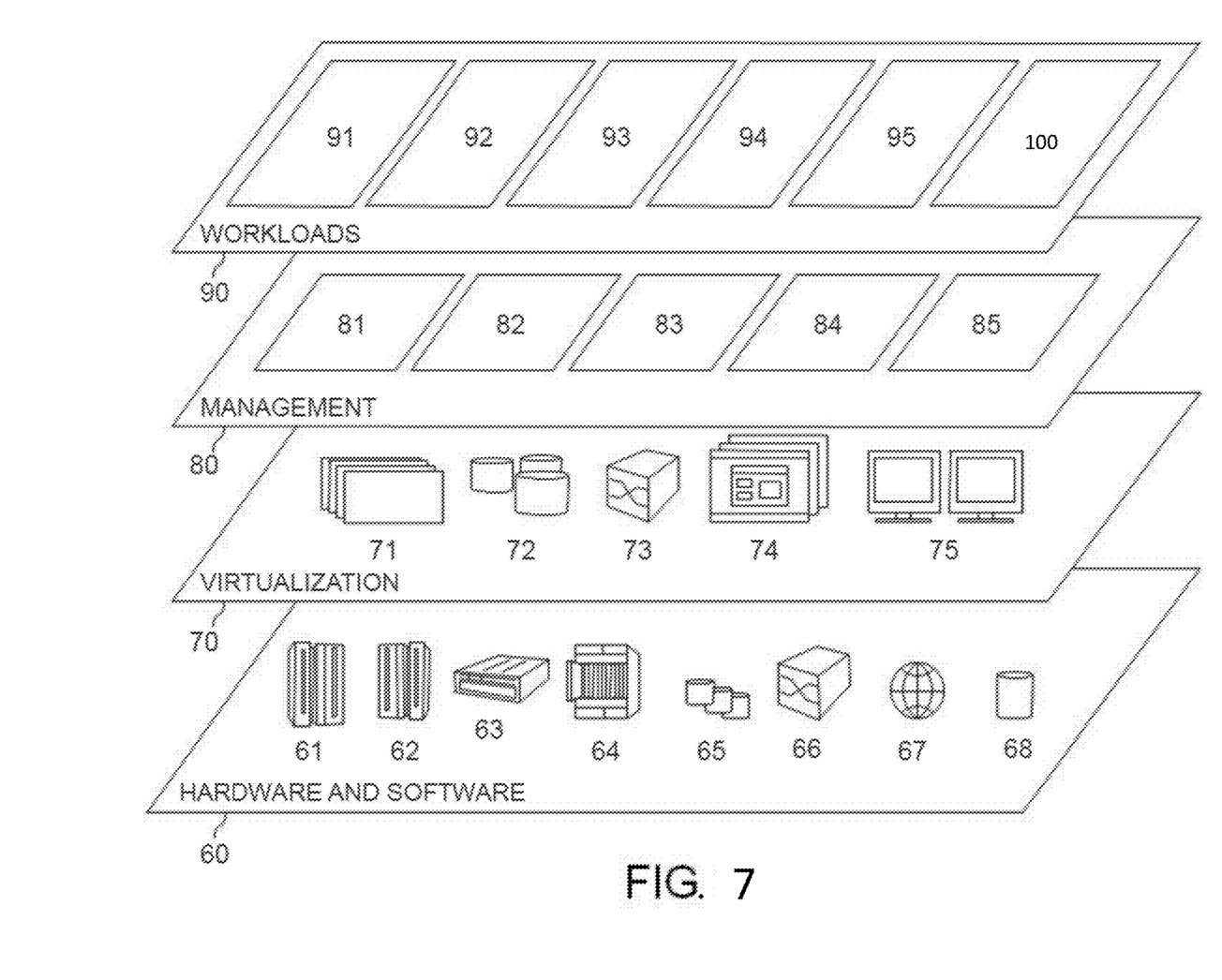
FIG. 7 depicts abstraction model layers according to an embodiment of the present invention.

Referring now to FIG. 7, an exemplary set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the customer segmentation method 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented customer segmentation method, the method comprising:
    defining a customer-event map that maps a set of characteristic features of each of a plurality of customers to a plurality of event categories;
    estimating a likelihood of an event-driven purchase for each product type and an event category combination, the likelihood being expressed as a mixture of a mode-based purchase likelihoods for each concurrent event in the event category combination, weighted by an estimated impact and a model is solved over all parameters to find a set of parameters using an expectation-maximization algorithm;
    determining groups of customers that respond to a similar event category based on a correlation between the groups of customers and the customer-event map; and
    creating an inventory list for each product type based on the likelihood of the event-driven purchases and based on the groups of customers,
    wherein the likelihood of the event-driven purchase is further estimated based on:
        event causality as a latent variable factoring a function of a quantity which models the likelihood of the event-driven purchase; and
        a function factoring the likelihood that a first customer type purchases for first category events,
    wherein the function of the quantity includes a first quantity value and a second quantity value which are estimated jointly to maximize a likelihood function used in the estimating to estimate the likelihood of the event-driven purchase for each product type and the event category combination, and
    wherein the likelihood function models a specific type of event that influences the customer as the latent variable.

2. The computer-implemented method of claim 1, further comprising iteratively updating the customer-event map and a purchase model of a purchase during a window of the event-driven purchase to create a model of a latent event response.

3. The computer-implemented method of claim 2, wherein the groups of customers that respond to a similar event category are determined based on the latent event response.

4. The computer-implemented method of claim 1,
    wherein the estimating estimates the likelihood of the event-driven purchase for each product-event combination by fitting a behavioral model corresponding to each event category of interest, and uses latent variables to determine a mixture of event category types which explain each customer's temporal purchase patterns,
    wherein the estimating estimates the likelihood of the event-driven purchase by subtracting an estimated baseline sales probability during an event window of the event category from a historical purchase probability during the event window to determine an estimated first event sales probability indicating the likelihood of the event driven purchase,
    wherein a mixture of event types that best explain each customers temporal purchase patterns are used to solve for the parameters producing a closest match over all event-customer combinations, and
    wherein the model predictions for the events give weight to both event segment and baseline probabilities, the weight being estimated as a function of the customer's purchase cluster and, demographic.

5. The computer-implemented method of claim 1, further comprising inputting a set of characteristic features for each of a plurality of customers.

6. A computer program product for customer segmentation, the computer program product comprising a non-transitory computer-readable storage medium having program instructions embodied therewith, the program instructions executable by a computer to cause the computer to perform:
    defining a customer-event map that maps a set of characteristic features of each of a plurality of customers to a plurality of event categories;
    estimating a likelihood of an event-driven purchase for each product type and an event category combination, the likelihood being expressed as a mixture of a mode-based purchase likelihoods for each concurrent event in the event category combination, weighted by an estimated impact and a model is solved over all parameters to find a set of parameters using an expectation-maximization algorithm; and determining, groups of customers that respond to a similar event category based on a correlation between the groups of customers and the customer-event map; and creating an inventory list for each product type based on the likelihood of the event-driven purchases and based on the groups of customers, wherein the likelihood of the event-driven purchase is further estimated based on:
event causality as a latent variable factoring a function of a quantity which models the likelihood of the event-driven purchase; and
a function factoring the likelihood that a first customer type purchases for first category events, wherein the function of the quantity includes a first quantity value and a second quantity value which are estimated jointly to maximize a likelihood function used in the estimating to estimate the likelihood of the event-driven purchase for each product type and the event category combination, and wherein the likelihood function models a specific type of event that influences the customer as the latent variable.

7. The computer program product of claim 6, further comprising iteratively updating the customer-event map and a purchase model of a purchase during a window of the event-driven purchase to create a model of a latent event response.

8. The computer program product of claim 7, wherein the groups of customers that respond to a similar event category are determined based on the latent event response.

9. The computer program product of claim 6, wherein the estimating estimates the likelihood of the event driven purchase for each product event combination by fitting a behavioral model corresponding to each event category of interest and uses latent variables to determine a mixture of event category types which explain each customer's temporal purchase patterns.

10. The computer program product of claim 6, wherein the estimating estimates the likelihood of the event driven purchase by subtracting an estimated baseline sales probability during an event window of the event category from a historical purchase probability during the event window to determine an estimated first event sales probability indicating the likelihood of the event driven purchase.

11. A customer segmentation system, said system comprising:
a processor; and
a memory, the memory storing instructions to cause the processor to perform:
defining a customer-event map that maps a set of characteristic features of each of a plurality of customers to a plurality of event categories;
estimating a likelihood of an event-driven purchase for each product type and an event category combination, the likelihood being expressed as a mixture of a mode-based purchase likelihoods for each concurrent event in the event category combination, weighted by an estimated impact and a model is solved over all parameters to find a set of parameters using an expectation-maximization algorithm; and determining, groups of customers that respond to a similar event category based on a correlation between the groups of customers and the customer-event, map; and creating an inventory list for each product type based on the likelihood of the event-driven purchases and based on the groups of customers, wherein the likelihood of the event-driven purchase is further estimated based on:
event causality as a latent variable factoring a function of a quantity which models the likelihood of the event-driven purchase; and
a function factoring the likelihood that a first customer type purchases for first category events, wherein the function of the quantity includes a first quantity value and a second quantity value which are estimated jointly to maximize a likelihood function used in the estimating to estimate the likelihood of the event-driven purchase for each product type and the event category combination, and wherein the likelihood function models a specific type of event that influences the customer as the latent variable.

12. The system of claim 11, wherein the memory further stores instructions to cause the process to perform:
iteratively updating the customer-event map and a purchase model of a purchase during a window of the event-driven purchase to create a model of a latent event response.

13. The system of claim 12, wherein the groups of customers that respond to a similar event category are determined based on the latent event response.

14. The system of claim 11, wherein the estimating estimates the likelihood of the event driven purchase for each product event combination by fitting a behavioral model corresponding to each event category of interest and uses latent variables to determine a mixture of event category types which explain each customer's temporal purchase patterns.

15. The system of claim 11, wherein the estimating estimates the likelihood of the event driven purchase by subtracting an estimated baseline sales probability during an event window of the event category from a historical purchase probability during the event window to determine an estimated first event sales probability indicating the likelihood of the event driven purchase.

16. The system of claim 11, embodied in a cloud-computing environment.

* * * * *